C. P. SEEGER.
TIRE REMOVING AND REPLACING DEVICE.
APPLICATION FILED MAR. 4, 1915.

1,207,641.

Patented Dec. 5, 1916.

Witnesses
E. Warren
Joseph P. Cullman

Inventor
Chas. P. Seeger

UNITED STATES PATENT OFFICE.

CHARLES P. SEEGER, OF ST. LOUIS, MISSOURI.

TIRE REMOVING AND REPLACING DEVICE.

1,207,641.

Specification of Letters Patent.

Patented Dec. 5, 1916.

Application filed March 4, 1915. Serial No. 12,115.

*To all whom it may concern:*

Be it known that I, CHARLES P. SEEGER, a citizen of the United States of America, a resident of the city of St. Louis, State of Missouri, have invented certain new and useful Improvements in Tire Removing and Replacing Devices, of which the following is a full, clear, and exact description, reference being had to the accompanying drawing, forming a part of this specification.

My invention relates to a combined expanding and contracting device adapted for use in removing and replacing various forms of tires, tire rims and tire holding rings.

The device may be used as an expander for a clencher tire, also to expand an expansible tire holding rim. It is also adapted for use in contracting certain types of tire rims to facilitate the removal of the tires from such rims.

Figure 1:
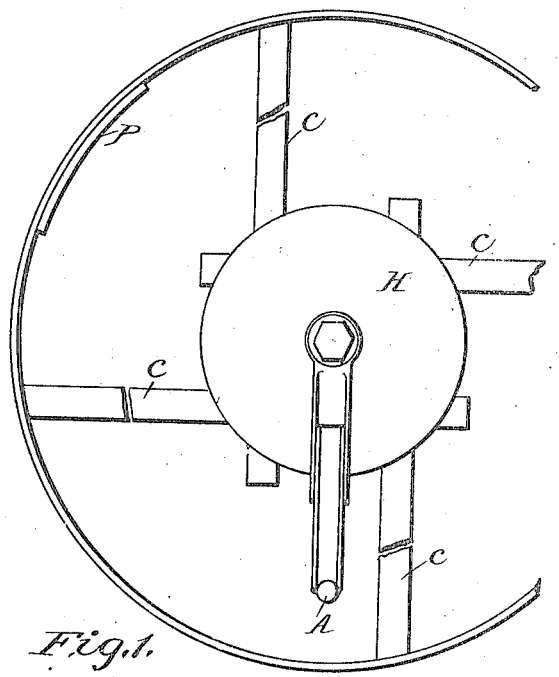
Figure 2:
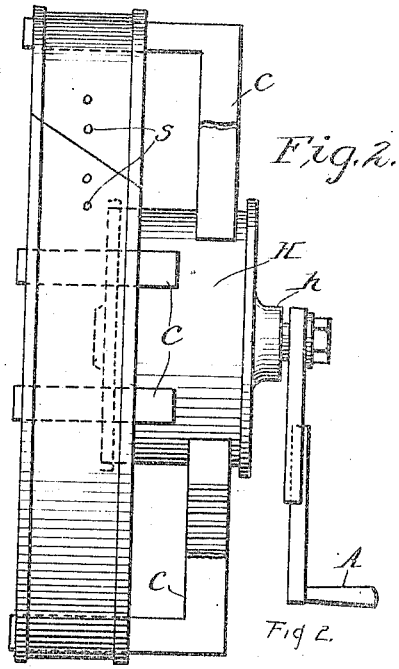
Figure 3:
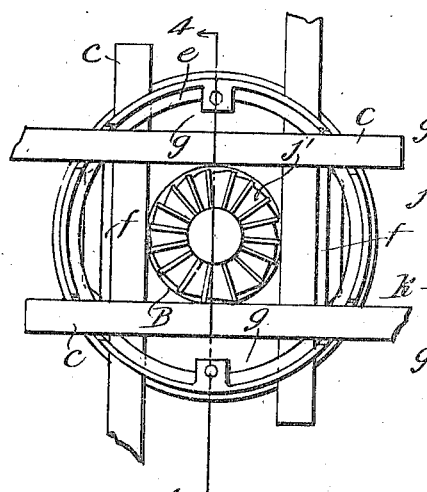
Figures 4, 5:
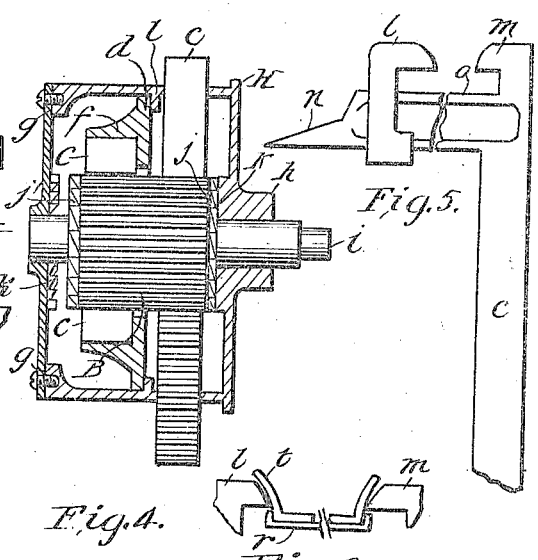
Figure 6:
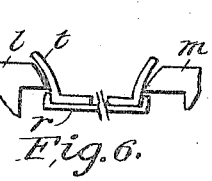

Figure 1 is a fragmentary front elevation showing the device applied to an expansible tire rim. Fig. 2 is a side elevation of the parts shown in Fig. 1. Fig. 3 is a view of the elements near the center of the device, the back cover plate of the housing being removed and some of the elements being omitted to expose the vertical rack arms. Fig. 4 is a vertical section taken approximately on the line 4—4, Fig. 3. Fig. 5 is an enlarged detail view showing the outer end portion of a rack arm. Fig. 6 is a detail view showing the rim of a wheel and fragments of the rim-receiving members shown in Fig. 5.

H designates a central body or housing provided with a bearing $h$ for a shaft $i$. This shaft is rotatably mounted in the front and rear walls of the housing H. The rear wall is removable and does not appear in Figs. 3 and 4. A pinion B, located at the center of the device, is fixed to the shaft $i$.

A designates an operating handle secured to one end of the shaft $i$. Rack arms $c$, meshing with the pinion B, are arranged tangential to the central opening in the housing H. These rack arms pass through openings, or channels, in the housing H.

$d$ designates a circular plate arranged within the housing and fitted to an annular rib $e$, the latter being formed integral with the housing.

$f$ designates flanges formed on the circular plate $d$ to provide guide channels for the rack arms $c$.

The rear wall of the housing is detachably secured to the device by means of screws applied to the lugs $g$. Reversely arranged ratchet teeth $j$ and $j'$, formed on the ends of the pinion B, are adapted to coöperate with corresponding teeth $k$ on the front and rear walls of the housing H. The operating handle A may be turned in either direction to expand or contract the member to which the rack arms $c$ are fitted, and after the rack arms have been adjusted to the desired positions, the operating handle may be shifted to move the shaft $i$ longitudinally, thus engaging the ratchet teeth $j$ or $j'$ with the corresponding ratchet teeth on the housing. The reversely arranged ratchet teeth constitute two latches one of which is adapted to lock the pinion and rack arms when the device is used as an expander, the other latch being adapted to lock said parts when the device is used as a contracting device.

Figs. 1 and 2 show the device applied to an expansible tire rim, the outer ends of the rack arms $c$ being arranged within the rim. After the rim has been expanded by turning the operating handle A, the handle is shifted to move the pinion shaft $i$ longitudinally, thus preventing the rack arms from moving inwardly. The expansible rim may then be locked in its expanded condition by the plate P (Fig. 1) and the studs $s$ (Fig. 2) said studs being adapted to enter the locking plate P. The rack bar $c$, shown in Fig. 5, is provided with a tapered tip or nose $n$ adapted to be forced under the steel rings used in some of the well known tire holding devices. After the tips $n$ have been fitted to the tire holding ring, the latter may be expanded by turning the operating handle. The rack arm $c$, shown in Fig. 5 is also provided with a lug $m$, and a member $l$ adjustably fitted to an arm $c$. The elements $l$ and $m$ are adapted to engage the inner face of an expansible tire rim, and they may also be applied to the side faces of tire holding rings $t$, as shown in Fig. 6. The rings $t$ are expansible and they coöperate with a rim $r$ to hold the tire in position.

I claim:—

1. In a device of the character described, a central body, a pinion rotatably mounted in said body, rack arms fitted to said pinion, said rack arms being movable in response to movements of said pinion, an operating handle for turning said pinion, and a locking device for locking the rack arms in the positions to which they are adjusted by said pinion, said locking device being under the control of said operating handle.

2. A combined expanding and contracting device comprising a central body, a shaft rotatably mounted in said central body, a pinion secured to said shaft, rack arms fitted to said pinion, said rack arms being movable in response to movements of said pinion so as to expand or contract the member to which the rack arms are applied, said shaft and pinion being adapted to turn in one direction when the device is used as an expander and in the opposite direction when used as a contracting device, reversely arranged latches one of which is arranged to lock said rack arms to prevent them from moving inwardly when the device is used as an expander, the other latch being adapted to lock said rack arms to prevent them from moving outwardly when the device is used as a contracting device, one of said latches being adapted to lock said rack arms in response to a longitudinal movement of said shaft in one direction and the other latch being adapted to lock the rack arms in response to a longitudinal movement of the shaft in the opposite direction, and an operating handle secured to said shaft, said pinion and reversely arranged latches being under the control of said operating handle.

3. In a device of the character described, a body provided with a central pinion receiving opening and a series of channels tangential to said central opening, a pinion in said opening, a shaft fixed to said pinion, rack arms arranged in said channels and engaging said pinion, and reversely arranged ratchet clutches on the ends of the pinion coöperating with corresponding clutches on the interior of said body when the shaft is moved longitudinally to bring one or the other of the ratchet clutches into engagement with the corresponding clutch.

CHAS. P. SEEGER.

Witnesses:
E. WARREN,
JOSEPH P. CULLINANE.